United States Patent [19]
Vogel

[11] Patent Number: 5,412,431
[45] Date of Patent: May 2, 1995

[54] DEVICE FOR CONTROLLING THE QUANTIZER OF A HYBRID CODER

[75] Inventor: Peter Vogel, Diepersdorf, Germany

[73] Assignee: U.S. Philips Corporation, New York, N.Y.

[21] Appl. No.: 184,406

[22] Filed: Jan. 21, 1994

Related U.S. Application Data

[63] Continuation of Ser. No. 892,098, Jun. 2, 1992, abandoned.

[30] Foreign Application Priority Data

Jun. 6, 1992 [DE] Germany .................. 41 18 571.4

[51] Int. Cl.⁶ ............................................. H04N 7/133
[52] U.S. Cl. ........................ 348/405; 348/419; 348/401
[58] Field of Search ............... 358/133, 136, 135; H04N 7/133, 7/137; 348/384, 390, 400, 401, 402, 405, 419, 420

[56] References Cited

U.S. PATENT DOCUMENTS

| | | | |
|---|---|---|---|
| 4,689,672 | 8/1987 | Furukawa et al. | 358/136 |
| 5,008,747 | 4/1991 | Carr et al. | 358/136 |
| 5,008,748 | 4/1991 | Carr et al. | 358/136 |
| 5,136,376 | 8/1992 | Yagasaki et al. | 358/133 |
| 5,144,424 | 9/1992 | Savatier | 358/133 |
| 5,144,426 | 9/1992 | Tanaka et al. | 358/133 |
| 5,307,163 | 4/1994 | Hatano et al. | 348/390 |
| 5,337,087 | 8/1994 | Mishima | 348/408 |

FOREIGN PATENT DOCUMENTS 0290085  4/1988  European Pat. Off. ..... H04N 7/133

OTHER PUBLICATIONS

CCITT Recommendation H.261, Document #584, 10 Nov. 1989, pp. 1-25. "Draft Revision of Recommendation H.261".

"Draft Revision of Recommendation H.261:Video Codec for Audiovisual Services at p×64 Kbit/s", Signal Processing: Image Communication 2, 1990, Mar. pp. 221-239.

"Description of Reference Model 7", Specialty Group on Coding for Visual Telephone, CCITT SGXV Working Party XV/4, doc. 446, Jan. 1989, pp. 1-34, Appendices A-G.

Primary Examiner—Howard W. Britton
Assistant Examiner—Bryan S. Tung
Attorney, Agent, or Firm—Michael E. Marion

[57] ABSTRACT

The pictures of a video signal (a1) are coded and quantized in data blocks by a hybrid coder (4). A quantizer (404) is controlled in dependence upon the filling level of a buffer memory. To improve the bit rate reduction without any loss of picture quality in a standardized hybrid coder, circuitry is provided with which in special cases the usual control of the quantizer (404) is replaced by another type of control. There is such a special case when a data block is recognized as being associated with the background of a scene. This data block is then transmitted with high accuracy (very fine quantization), whereas the data blocks of the subsequent video pictures associated with the same background are not transmitted at all (coarsest quantization).

3 Claims, 3 Drawing Sheets

| Z | E | A | FZ |
|---|---|---|---|
| Z1 | L ≥ 10 ∧ a6 < 4800 | qz = 4 | Z2 |
| Z1 | L < 10 ∨ L≥10 ∧ a6≥4800 | qz = qz (a6) | Z1 |
| Z2 | L ≥ 10 | qz = 32 | Z2 |
| Z2 | L < 10 | qz = qz (a6) | Z1 |

DEVICE FOR CONTROLLING THE QUANTIZER OF A HYBRID CODER

This is a continuation of application Ser. No. 07/892,098, filed on Jun. 2, 1992, now abandoned.

BACKGROUND OF THE INVENTION

The invention relates to a device for controlling the quantizer of a hybrid coder by which the pictures of a video signal are coded and quantized in data blocks and in which the quantizer is controlled in dependence upon the filling level of a buffer memory.

Such devices are applicable, for example, in picture telephony systems for obtaining video pictures of adequate quality at the receiver end by controlling the quantizer of a hybrid coder at a possibly low transmission bit rate (for example 64 kbit/s).

A coding procedure suitable for hybrid coders is described in greater detail in CCITT Recommendation H.261 (compare, for example: Draft Revision of Recommendation H.261: Video-codec for Audiovisual Services at p.64 kbit/s. Signal Processing: Image Communication 2 (1990) 221–239, Elsevier Science Publishers B.V.). In this Recommendation the components required for implementation of the method and their functions are also described. An embodiment of a hybrid coder or decoder corresponding to the H.261 Recommendation is described in the document "Description of Reference Model 7", Specialist Group on Coding for Visual Telephony, CCITT SGXV Working Party XV/4, doc. 446, 1989. The first-mentioned document will hereinafter be referred to as (D1) and the second-mentioned document will hereinafter be referred to as (D2).

According to (D1) a hybrid coder consists of a source coder which comprises a quantizer, a multiplex coder which codes the main and sub-information components supplied by the source coder into binary code words and combines them to a serial data stream, and a subsequent buffer memory which is succeeded by a line coder.

A coding control means controls the source coder and the multiplex coder in dependence upon the filling level of the buffer memory.

In this connection the name hybrid coder is based on the simultaneous use of two coding principles, namely the interframe principle and the intraframe principle. In the interframe principle the time dependence of the video pictures is utilized and in the intraframe principle the local dependence within the video pictures is utilized.

If the buffer memory is about to run empty or overflow, the quantization step (magnitude of the quantization intervals) is rendered finer or coarser in order that a larger or smaller number of data respectively occur. The control is realized in such a way that the quantization step remains constant within a data block of a given size (macroblock).

In this connection data block is understood to mean data of a section of a video picture. This section is, for example, a square part of the visible video picture. In (D1) (also compare EP 029 085 A2) four types of data blocks are distinguished:

a) blocks consisting of 64 numerical values which either represent the luminance values of a square picture section consisting of 8×8 pixels or one of the two chrominance components of a square picture section of 16×16 pixels, b) macroblocks consisting of four luminance and two chrominance blocks which jointly represent all data of a quadratic picture section of 16×16 pixels, c) block groups consisting of 33 macroblocks, d) video pictures consisting of 396 macroblocks each.

The term data block will hereinafter be utilized in its smaller sense according to (D1) and in its wider sense, in which the relevant picture sections may have an arbitrary size and shape.

According to (D1) a discrete cosine transform is performed with the blocks in the source coder. This leads to a bit rate reduction based on the geometrical (or rather two-dimensional) correlations which exist within a video picture and represents a concrete form of the above-mentioned intraframe principle.

The time dependence of consecutive video pictures is utilized, for example in that the difference between data is generated and further processed by means of equivalent pixels of two consecutive video pictures. Pixels or data blocks of video pictures which are different from each other will be referred to as equivalent if they have the same coordinates or addresses, i.e. if they have the same location within a video picture.

SUMMARY OF THE INVENTION

It is an object of the invention to provide a device of the type described in the opening paragraph which is compatible with (D1) and (D2) and leads to a further bit rate reduction for transmitting video pictures without loss of quality, or to an improvement of the picture quality at the same transmission bit rate.

This object is solved by the following characteristic features.

a) Means by which the difference between two consecutive data blocks of a sequence of equivalent data blocks is determined and by which a background index L is increased by one unit when the difference falls below a predetermined value, and by which the background index L is set to its initial value whenever the difference is above the predetermined value;

b) means with which the quantizer, unlike the buffer control for transmitting a representative block for a sequence of equivalent data blocks, is set to a finer quantization whenever the associated background index L has a value which is above a threshold value $L_{max}$ and whenever at least one further system parameter has reached or exceeded a predetermined threshold;

c) means with which the quantizer, unlike the buffer control for transmitting the data blocks subsequent to the representative block of a sequence of data blocks, is set to a quantization which is at least as coarse as the quantization effected by the buffer control, as long as the background index L is above the value $L_{max}$.

Further embodiments of the invention are stated in the sub-claims.

The invention is based on the recognition that picture sections which remain unchanged for a comparatively long time (approximately 3 seconds or longer) also occur in a motion picture scene. These sections are either associated with the unchangeable background of the scene or with structures which hardly change within a few seconds (quasi-background). To economize on bits during coding, a control of the quantizer different from (D2) is performed in exceptional situations due to the possible existence of a background or quasi-background, which control procedure is carried out as follows.

First, equivalent macroblocks (more generally: data blocks) of two consecutive video pictures are checked on conformity. If the two data blocks correspond within predetermined tolerance limits, a background index, or integer L, is increased by one unit. This check is repeated with the equivalent data blocks of the second and third video pictures and the background index L is increased by a finer unit in the case of conformity. The procedure is carded out in this way for a principally arbitrarily long sequence of equivalent data blocks. If the no-conformity situation occurs only once, the background index L is set to its initial value and with this initial value the check for the next video pictures is started again. This procedure is performed for all 396 macroblocks of the video pictures. If the background index L of one of the 396 sequences of equivalent data blocks reaches a predetermined threshold value $L_{max}$, the associated picture section is treated as a background. This means that representative dam for this picture section are transmitted with high precision and in that subsequently no data blocks different from zero are transmitted as long as the background index remains above the value $L_{max}$. Those representative data which—unlike the quantization instruction in accordance with (D2)—are transmitted with high precision will hereinafter be referred to as "representative blocks". A necessary but inadequate condition for transmitting a representative block is that the associated background index L must have reached the value $L_{max}$. Further conditions will be described hereinafter.

At the receiver end the decoder uses the representative blocks in accordance with (D1) and (D2) only for representing the background in the relevant picture sections of all subsequent video pictures. When the invention is used, a decoder as described in (D1) and (D2) thus need not be modified.

If a video picture sequence consists of, for example background only, it may occur that the background index L simultaneously reaches the value $L_{max}$ for a great many of the 396 sequences of equivalent data blocks. In such a case it should be prevented that for these sequences the associated representative blocks are generated simultaneously and that this causes overflow of the buffer memory. Therefore, the instant of generating a representative block is also made dependent on the value of at least one further system parameter, for example the filling level of the buffer memory or the actual quantization step.

In an embodiment of the invention the determination of the difference between two equivalent data blocks is coupled with a litering operation for substantially eliminating the noise or other interference caused by the picture data source. This coupling provides the advantage that only one picture memory is required for calculating the difference on the one hand and for the (temporal) filtering operation on the other hand. The filtered data block consists of a mean value of all data blocks of a sequence of equivalent data blocks which have occurred during count-up of the background index L. This is realized in that the filtered data block is the output signal of a recursive filter. The representative block may be either the data block in which the background index L has reached the value $L_{max}$ or a data block which was gained with the above-mentioned recursive filter. The Euclidean vector (cf. formula (1)) is provided for the quantitative determination of the difference between two data blocks. The data of the two blocks are assumed to be components of a vector. The Euclidean vector is then formed from the differential vector. It has been found that not all data of the data blocks are to be taken into account when determining the difference; a determination by means of only the luminance values yields equally satisfactory results while using a smaller number of components. Whether the difference is to be considered as large or small is determined by comparing the Euclidean vector with a threshold T. A suitable threshold value for the Euclidean vector is the value T=48.

Another possibility is to use two different vector values simultaneously for the differential vector, namely the absolute value and the maximum value. The absolute value consists of the sum of the number of vector components and the maximum value consists of the vector component which is largest in number. If the absolute value is below a first threshold T1 and the maximum value is below a second threshold T2, the difference between the two data blocks is small. The values $T_1 = 3 \times 256$, $T_2 = 20$ have proved to be suitable threshold values.

The invention will be described in greater detail with reference to the drawing and an embodiment.

DETAILED DESCRIPTION OF THE PREFERRED EMBODIMENTS OF THE INVENTION

Figure 1:
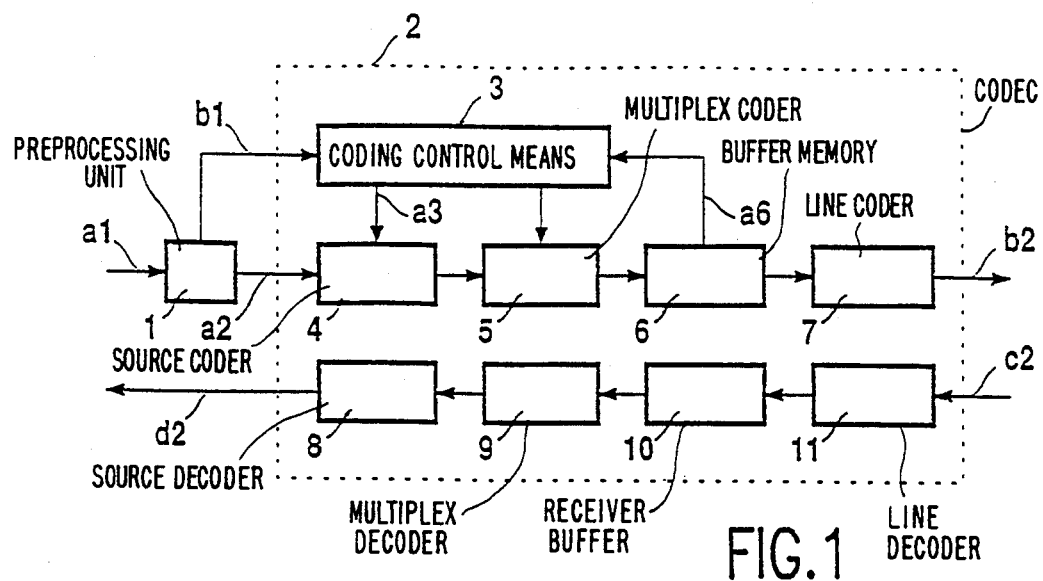
FIG. 1 shows a block diagram of a codec supplemented with the devices according to the invention.

In FIG. 1 the components within broken lines are part of a codec 2 which has all circuit and function characteristics required in accordance with (D1). The components 3, 4, 5, 6 and 7 form part of the hybrid coder of the codec 2 and the components 8, 9, 10, 11 form part of the (hybrid) decoder. Identical reference symbols will hereinafter be used for lines, connections and signals transmitted through these lines.

The component 4 is a source coder whose output data are applied to a multiplex coder 5. The multiplex coder 5, which is controlled by a coding control means 3, codes its input data in a binary manner and combines them to a serial bit stream which is continuously read into the subsequently arranged (transmission) buffer memory 6. The filling level of the buffer memory 6 is monitored by the coding control means 3 which also controls the source coder with the aid of the filling level dam, particularly the quantizer of the source coder. After the digital video signal has been read from the buffer memory 6, the signal is passed on to a line coder 7 and transmitted to a receiver via a line b2.

The video data to be coded are applied in macroblocks to a preprocessing unit 1 via a line a1. The preprocessing unit 1 is used for the additional control of the quantizer; it compares equivalent macroblocks of consecutive video pictures and derives the value of a background index L therefrom, which value is transmitted to the coding control means 3 via a line b1. Further details about functions of the preprocessing unit 1 will be described hereinafter.

The video signal to be decoded is applied to the decoder 8, 9, 10, 11 via a line c2. This signal is decoded by a line decoder 11, written into a receiver buffer 10, decoded by a multiplex decoder 9 and a source decoder 8 and applied to a monitor (not shown) via a line d2.

Figure 2:
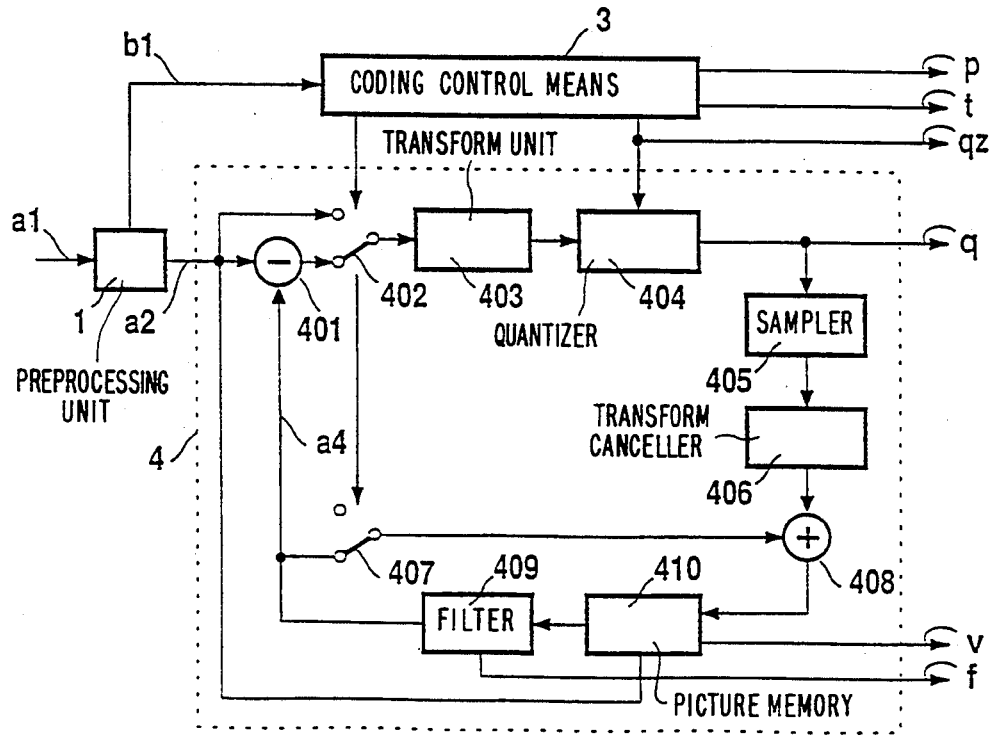
FIG. 2 shows details of a block diagram of a source coder supplemented with the devices according to the invention.

FIG. 2 also shows a part of the codec of FIG. 1 diagrammatically, namely the source coder 4 with the coding control means 3 and the preprocessing unit 1. The coding control means 3 and the source coder 4 are connected to the multiplex coder 5 shown in FIG. 1 via lines p, t, qz, q, v and f. Sub-information components are transmitted via the lines p, t, qz, v and f and main information components are transmitted via the line q. Further details about the type and meaning of main and sub-information components are given in (D1).

The source coder 4 comprises a transform unit 403 and a subsequent quantizer 404. With these two components a significant part of the bit rate reduction is achieved in a coder in accordance with the H.261 Recommendation. The output signal, which consists of quantization indices, is applied to the subsequent multiplexer 5 via the line q. A feedback loop comprises a unit 405 for gaining quantized sampling values from the quantization indices. The action of the transform unit 403 is cancelled by a unit 406 with the quantized sampling values. The picture decoded in blocks is stored in the picture memory 410 in blocks by means of an adder 408 and a picture memory 410. The subtracter 401 forms the difference between the data of an input block and the data of a prediction block filtered by a filter 409 via a line a4. This difference will hereinafter be referred to as difference block. The switch 402 and a further switch 407 are controlled by the coding control means 3 in such a way that they will remain in the position shown when difference blocks are to be coded and that they will be switched to their second position in the other case (when directly coding the input blocks).

The filter 409 in the feedback loop of the source coder 4 may be effectively switched; the switching condition of this filter 409 is indicated by the signal f. Motion estimation is also performed by means of the picture memory 410. This motion estimation results in the components of a two-dimensional motion vector whose data are passed on via the line v.

Figures 3, 4:
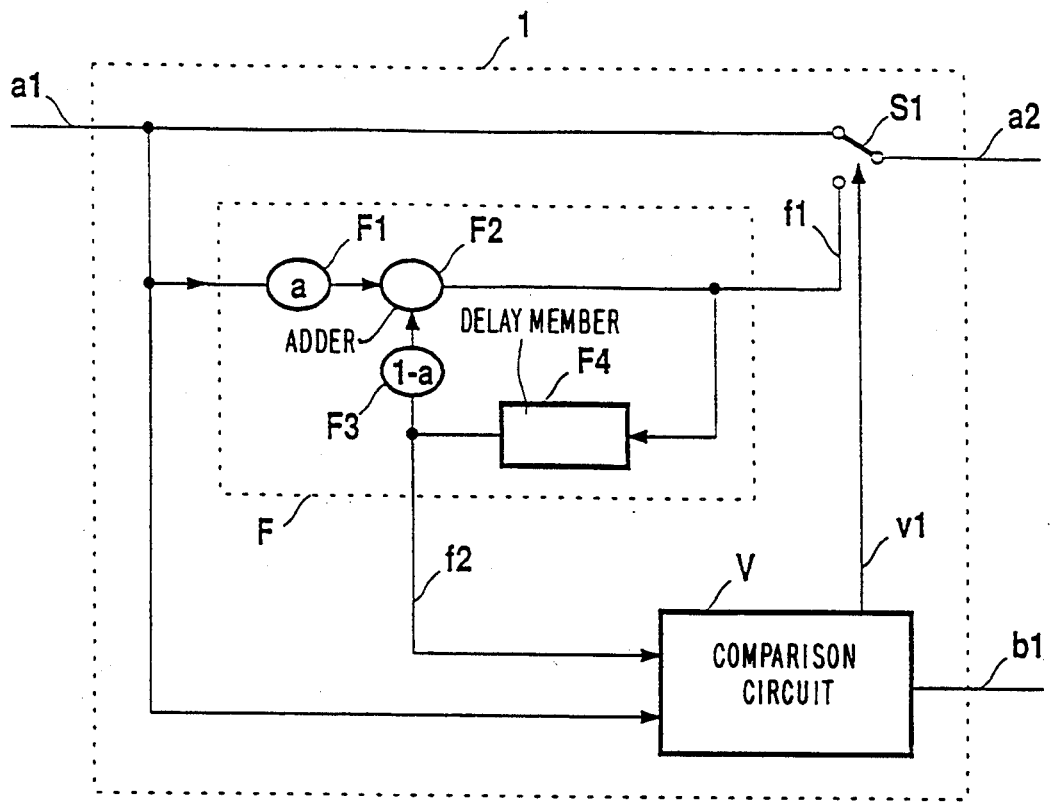
FIG. 3 and 4 show details of the device according to the invention for controlling the quantizer.

FIG. 3 shows diagrammatically the preprocessing unit 1. Their input and output lines have the same significance as those in FIG. 1. Main components of the preprocessing unit 1 are a recursive filter F and a comparison circuit V. The filter F substantially eliminates interferences such as, for example camera noise in all 396 macroblocks of a video picture by means of a suitably chosen filter parameter a (here having the value of 0.5). A macroblock is multiplied by the parameter a by a first multiplier F1 at the input of the filter F and added to the equivalent macroblock by an adder F2, which has been delayed by one clock period via a delay member F4 and multiplied by the factor 1-a=0.5 by a further multiplier F3. An addressable picture memory is used as a delay member F4. The filtered and delayed macroblock at the output line f2 of the delay member F4 is compared by the comparison circuit V with the undelayed and unfiltered macroblock at the input line a1.

In this connection comparing or determining the difference means that the distance determined in accordance with a distance standard between two equivalent macroblocks is evaluated. The Euclidean vector is used as a distance standard, namely $$\sqrt{\sum_{i=1}^{n} x_i^2} \quad (1)$$

i.e. the square root of the sum of the numbers $x^2_i$, in which $x_i$ refers to the components of the difference vector x which results when the data of each of two consecutive equivalent macroblocks are combined to form two respective vectors and the vector difference is formed between these two vectors. The sum in formula (1) only covers the luminance values of a macroblock, so it is n=256 because it has been found that an additional use of the chrominance values does not essentially change the distance defined by means of (1). Thus, the same information is obtained while using less elaborate computations.

If the standard denned by (1)—abbreviated to $\|x\|$ — falls below a threshold T, with $T=3.\sqrt{n}=3.\sqrt{256}=48$, the comparison circuit V applies a counting pulse to the coding control means 3 via the line b1 and sets a controllable switch S1 via a control line v1 to a position in which the filtered but undelayed macroblock is applied to the source coder 4 via an output line f1 of the filter F and the line a2. If $\mu x\mu$ is larger than or equal to T, no counting pulse is transmitted and the switch S1 is maintained in the position shown. In this position the unfiltered and undelayed macroblock is applied to the source coder 4. Applying filtered macroblocks via the line a2 only when the distance $\|x\|$ is below the threshold T is sensible because in this case differences are filtered out which are predominantly based on noise and not on a change of scenes. If the filter parameter a is chosen to be 1, the filter action of the filter F is eliminated.

The realization of a circuit evaluating formula (1) and performing the comparison with the threshold T, and applying control and counting pulses via the lines v1 and b1 is evident to those skilled in the art so that a description of functional characteristics is considered to be sufficient in this case.

The following embodiments are described to illustrate the necessary changes which must be performed on the coding control means 3 so as to realize the invention in the structure of the preprocessing unit 1. It is also feasible to use a plurality or even all measures for realizing the invention in the preprocessing unit 1. The preprocessing unit 1 could then generate all control signals deviating from (D1) and (D2) for the quantizer 404, which signals control the quantizer 404, if necessary, instead of the prior-art control signals.

However, it is more advantageous to incorporate a maximal number of characteristic features of the invention in the coding control means 3 because in modem hybrid coders it consists of a programmable computer anyway and changes involve only interventions in existing programs or program sections. The necessary capabilities of translating functional indications into program steps are within the scope of capabilities of those skilled in the art so that only a detailed functional description is given which is considered to be sufficient for setting up programs in the higher program languages such as C, Fortran, Basic, DSPARC or DABL, To support this statement, a series of sources comprising programming examples, inter alia, for complicated counters has been mentioned below.

A counter is arranged in the coding control means 3 for each macroblock including its equivalent macrobloch. This amounts to a total number of 396 counters or their realization by means of a program (compare, for example [5]). If the coding control means 3 receives a counting pulse via the line b1 from the preprocessing unit 1 after a macroblock has been processed, the counter associated with this macroblock is upped by one unit. If the coding control means 3 does not receive a counting pulse, the counter is set to its initial value 1.

The further description will be given with reference to FIG. 4. FIG. 4 shows an automaton table as used for describing automatons. The first column Z indicates the stands of the automaton. The second column E states events. The third column A indicates the procedure which is to be performed when the automaton is in the state of the associated line and when the associated event has occurred. The fourth column FZ states the subsequent state to which the automaton should change when all indications on the same line hold true or when the required operations have been carried out. Each of the above-mentioned counters is associated with such an automaton which uses, inter alia the position L (background index) of the associated counter for the purpose of determining by way of query whether given events indicated in column E have occurred or not occurred.

In the first line under column E it is queried whether the background index L is larger than or equal to $L_{max}=10$ and whether simultaneously (logic conjunction A) the filling level a6 of the buffer memory 6 is smaller than 4800 bits. The capacity of the buffer memory 6 is 6400 bits maximum; the instantaneous filling level of the buffer memory 6 is continuously transferred to the coding control means 3 as number a6.

If the two conditions are fulfilled, the variable qz is set to 4. This variable indicates the number of the quantization characteristic used by the quantizer 404. With this characteristic the representative block is quantized. Overall, there are 32 quantization characteristics and as many numbers therefor. The characteristic having number 1 is the one with the finest quantization, i.e. the one with the smallest quantization intervals. With an increasing number for the quantization characteristics, the magnitude of the quantization intervals also increases until the characteristic having the number 32 whose quantization is coarsest. The quantization characteristic of number 4 is thus a characteristic having a relatively fine quantization. After the allocation of a value to the variable qz the state variable Z is set to the value Z2.

If the automaton is in state Z1 and if the event in the second line under E has occurred, namely $L<L_{max}=10$ or (logic disjunction V) $L>L_{max}=10$ and (A) a6>4800, the characteristic in accordance with (D2) is used which is a function of the filling level a6 and is denoted by qz=qz(a6) in column A. This function is stored in the form of a table in the memories of the coding control means 3. The state variable Z is not changed.

The coarsest quantization is used when the automaton is in state Z2 and when $L>L_{max}=10$, as is shown by means of line 3 in FIG. 4. In this case the state variable is not changed either. During the coding process the associated background index L can then only be set to 1 so that the conditions stated in columns Z and E of the fourth line in FIG. 4 hold true. In this case the usual quantization characteristic qz(a6) is used and the variable Z is reset to the value Z1.

Figure 5:
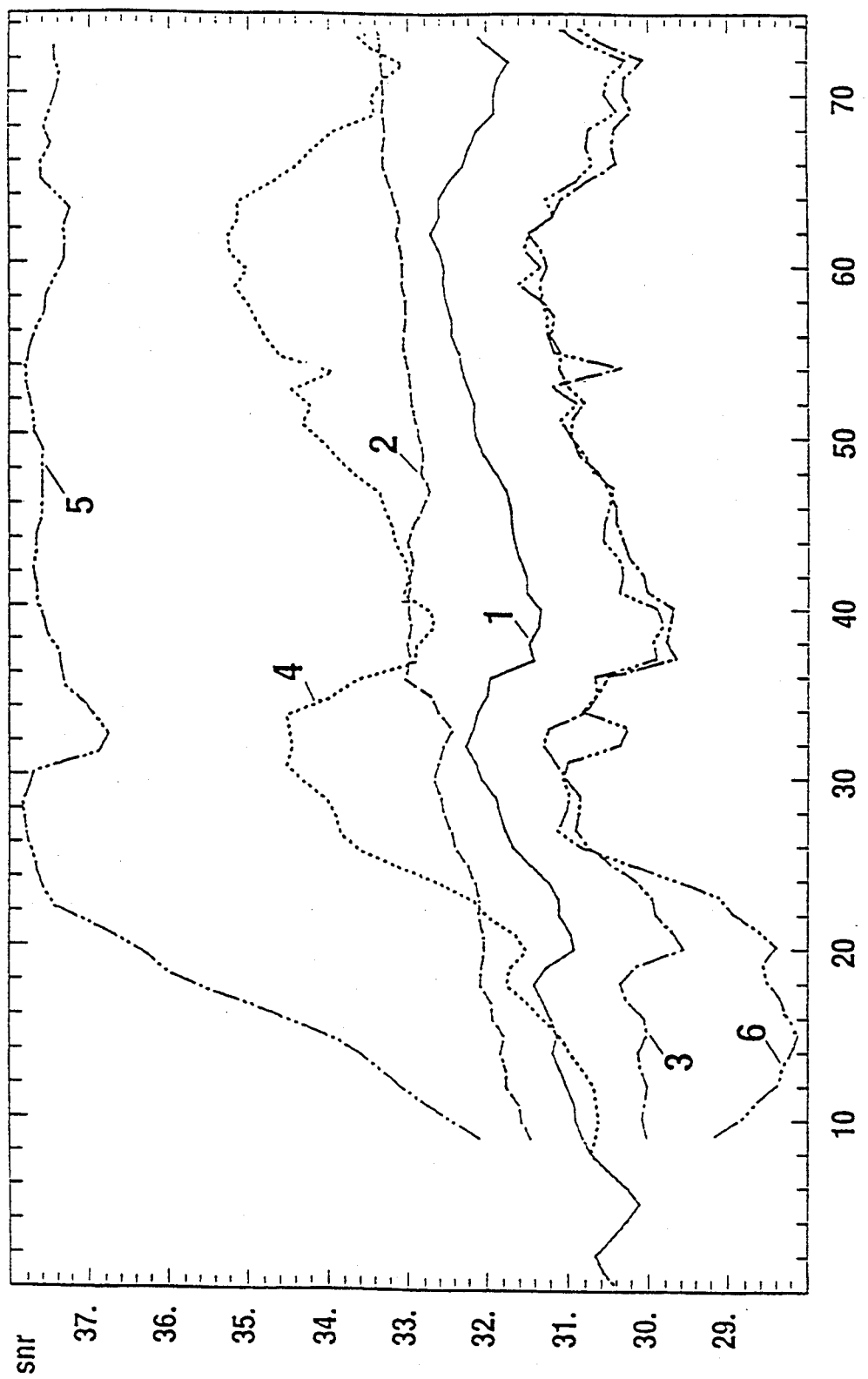
FIG. 5 shows results of a simulation for a standard picture sequence.

The effectiveness of the invention is shown by the curves in FIG. 5. In FIG. 5 the signal-to-noise ratio snr of each decoded picture is plotted against the number of pictures of a test sequence (salesman) consisting of 75 frames. The curves 1, 2 and 3 are gained by means of a coder constructed in accordance with (D1) and (D2), while the curves 4, 5 and 6 are gained by means of a coder constructed in accordance with the invention.

Curves 3 and 6 represent the signal-to-noise ratio for those picture areas which do not belong to the background or the quasi-background and are here denoted as foreground. Initially, the signal-to-noise ratio for these picture areas is more favourable for the curve 3 than for the curve 6. This is understandable because a coder in accordance with the invention initially builds up background areas with great accuracy, which is at the expense of the foreground. Only when no information is to be transmitted for the background any longer, do the curves 3 and 6 almost coincide.

The curves 2 and 5 represent the signal-to-noise ratio for the background. It is evident that the curve 5 shows an essentially better result. This also applies to curves 1 and 4 in which the overall picture area is used for determining the signal-to-noise ratio.

The following documents are available to those skilled in the art as tools for simulating circuits by means of programs or as tools for converting the function indications into programs:

[1] Fliege, N.: "Digitale Filter reit dem Signalprozessor 2920". Elektronik (1981), pp. 81 to 85 and pp. 89 to 94.

[2] Miiller, K.H.: "Echtzeitsimulation reit dem Analog-Prozessor 2920". Elelaronik (1981), pp. 95 to 98.

[3] Signal Processing Algorithms. Prentice-Hall., Inc., Englewood Cliffs, N. J. 07632.

[4] Oberhofer, A.: "Zustandsregelung mit digitalen Filtern". Elelaronilk (1985), pp. 63 to 68.

[5] Handbooks published by Daisy Systems Corporation "Simulation Compilation". August 1988 and "Daisy Behavioral Language". September 1988.

[6] Handbook published by Data U0 Corporation, January 1989, ISDN 984-0029-002, pp. 10–28 and 10–30.

I claim:

1. In a hybrid coder for coding and quantizing a plurality of data blocks of pictures of a video signal, wherein said hybrid coder comprises a buffer memory and a quantizer and assumes a stable first state (Z1) wherein the quantization of said quantizer is at a first quantization level which depends on the fill level of said buffer memory, a device for further controlling the quantization of said quantizer by causing the coder to assume a second state (Z2) wherein said quantizer is subject to a second control, said device comprising:

a) means coupled to the input of said hybrid coder, for sequentially determining the respective differences between consecutive pairs of data blocks of a sequence of equivalent data blocks and whereby an index L having an initial value is incremented by one, each time a respective difference between a pair of said consecutive pairs of data blocks of a sequence of equivalent data blocks is less than a predetermined value, and whereby said index L is set to said initial value each time the respective difference between a pair of said consecutive pairs of data blocks of a sequence of equivalent data blocks is more than said predetermined value;

b) means coupled to said quantizer, for switching said coder into said second state and said quantizer from the first quantization level to a predetermined fine quantization level whenever the value of index L is greater than a threshold value $L_{max}$ and a further system parameter satisfies a further system condition; and c) means coupled to said quantizer for setting said quantizer from said fine quantization level to a predetermined coarse quantization level when both said coder is in the second state and the value of index L is greater than said threshold level $L_{max}$.

2. The system of claim 1, wherein said further system parameter is the filling level (a6) of said buffer memory.

3. The system of claim 1, further comprising means connected to said means coupled to the input of said hybrid coder for filtering out noise in the video signal.

* * * * *